United States Patent Office 2,725,404
Patented Nov. 29, 1955

2,725,404

DEHYDROCHLORINATION OF BENZENE HEXACHLORIDE

Gustavo E. Montes, Baton Rouge, La., assignor to Ethyl Corporation, New York, N. Y., a corporation of Delaware No Drawing. Application November 1, 1951, Serial No. 254,435

10 Claims. (Cl. 260—650)

This invention relates to the dehydrochlorination of benzene hexachloride and more particularly to a new and improved catalytic method for the dehydrochlorination of benzene hexachloride, characterized by an unusual and novel distribution of products.

The dehydrochlorination of benzene hexachloride has been traditionally carried out by thermal treatment at temperatures in the vicinity of 275–500° C., usually in the presence of a catalyst, such as iron or ferric chloride. It has been proposed that this reaction proceeds stepwise, with the first step being the elimination of one molecule of hydrogen chloride from a molecule of benzene hexachloride to produce 2,3,4,5,6-pentachlorocyclohexene-1. This intermediate then loses another molecule of hydrogen chloride, producing a mixture of tetrachlorocyclohexadienes, which then completes the reaction chain by giving up a third molecule of hydrogen chloride, to yield as the end products of the dehydrochlorination a mixture of 1,2,3-trichlorobenzene, 1,2,4-trichlorobenzene and 1,3,5-trichlorobenzene. The above is an attractive method for the preparation of trichlorobenzene, particularly when an outlet for the non-gamma isomers of benzene hexachloride is thereby provided. However, this procedure is inefficient in that large quantities of 1,2,3-trichlorobenzene, for which there exists no market outlet, are produced along with the desired 1,2,4- isomer. The 1,3,5- isomer is produced only in negligible amounts. The dehydrochlorination product, therefore, must be either purified by a difficult and costly fractionation operation or the crude mixture must be sold at a reduced premium. Another disadvantage of this method is that, due largely to the high temperatures employed, considerable carbonization of organic material takes place in the reaction zone. The carbonaceous material thereby formed is deleterious to the process in that it tends to foul process equipment, it represents a loss of potential yield of dehydrohalogenation product, and it adversely affects the reaction rate and the efficiency of the catalyst employed. Further disadvantages of this method of dehydrochlorination of benzene hexachloride lie in the fact that the reaction rate is somewhat slow at practicable temperature, thus limiting the production per unit amount of equipment, and that, in order to increase the reaction rate to a more economical velocity, excessive temperatures must be employed.

The above method of dehydrochlorination of benzene hexachloride is also deficient in that the reaction sequence cannot be stopped at any of the intermediate products, but always proceeds to completion, with the formation of trichlorobenzenes. Thus, valuable chemical intermediates and biocides present in the reaction mixture such as 2,3,4,5,6-pentachlorocyclohexene-1, are not recovered but are converted to the completely aromatized end-products.

Another method used for the dehydrochlorination of benzene hexachloride consists of heating the benzene hexachloride with a solution of alkali, such as sodium hydroxide or potassium hydroxide. This procedure is extremely inefficient in that the valuable hydrogen chloride produced in the dehydrochlorination is converted by the action of the alkali into relatively valueless sodium chloride or potassium chloride.

A principal object of my invention, therefore, is to provide a new and improved method for the dehydrochlorination of benzene hexachloride. Another object is to provide a catalytic process for producing a mixture of trichlorobenzenes in which 1,2,4-trichlorobenzene predominates over 1,2,3-trichlorobenzene.

Another object is to provide a method of dehydrochlorinating benzene hexachloride whereby a preponderant amount of 1,2,4-trichlorobenzene, together with 2,3,4,5,6-pentachlorocyclohexene-1, is formed. Another object is to provide a practicable means of producing 2,3,4,5,6-pentachlorocyclohexene-1 by the dehydrochlorination of benzene hexachloride. Still another object is to provide a method for greatly increasing the rate of dehydrochlorination of benzene hexachloride. A further object is to provide a method for the dehydrochlorination of benzene hexachloride in which hydrogen chloride in high purity is produced as one of the products. Additional objects include furnishing a means whereby benzene hexachloride can be dehydrochlorinated at temperatures appreciably lower than has been heretofore possible, and with little or no carbonization of organic material in the reaction zone.

I have discovered that benzene hexachloride can be readily and efficiently catalytically dehydrochlorinated at a high reaction velocity to yield a mixture of isomeric trichlorobenzenes, in which the proportion of 1,2,4-trichlorobenzene is markedly higher than has heretofore been possible, by contacting the benzene hexachloride with a selective, highly specific catalyst, as described hereafter. Moreover, my invention can be carried out so that under certain conditions substantial quantities of 2,3,4,5,6-pentachlorocyclohexene-1 are obtained. The reason for this is not clear, since this intermediate should be thermodynamically unstable in comparison with the trichlorobenzenes. Be that as it may, the production of this cyclic olefin under conditions which permit it to be isolated before being further dehydrochlorinated is an important feature of my invention.

By benzene hexachloride I mean either a total stereoisomeric mixture of 1,2,3,4,5,6-hexachlorocyclohexanes, such as is produced in the additive chlorination of benzene (hereafter designated as "crude" benzene hexachloride), or any of the individual 1,2,3,4,5,6-hexachlorocyclohexane stereoisomers or any mixture of two or more of the stereoisomeric 1,2,3,4,5,6-hexachlorocyclohexanes, including a mixture such as that arising when the gamma isomer has been removed from a total stereoisomeric mixture.

The catalysts which are suitable for use in my process comprise certain inorganic and organic compounds containing nitrogen. Specifically, I have found that the nitrogen should be present as aminoid nitrogen, that is, nitrogen to which either hydrogen, a hydrocarbon residue or a substituted hydrocarbon residue is directly attached by chemical bonding. Examples of this type of linkage are found in ammonia, ammonium salts, amines, amine salts, amides, thioamides, diamines, hydrazines, hydrazine salts, imines, quinone-imines, hydrazides, hydrazones, oximes, hydroxylamines, hydroxylamine salts, azo compounds, hydrazo compounds, carbamates, sulfamates, cyanamides, etc. To be beneficial in my process the aminoid nitrogen compound should be of a basic nature under the reaction conditions employed; that is, it should be capable of reacting with acidic compounds, such as hydrogen chloride, to form salts. Certain types of compounds, e. g. amine salts and ammonium salts, while not of a basic nature at ordinary temperatures, are converted to basic compounds under the reaction conditions which I employ, and thus are catalysts in my invention.

When I contact benzene hexachloride, as herein defined, at a temperature of at least 180° C. with catalytic quantities of one of the specific and selective catalysts described above, I smoothly and quickly produce mixtures of 1,2,4-trichlorobenzene and 1,2,3-trichlorobenzene, in which the ratio of the commercially important 1,2,4- isomer to 1,2,3- isomer ranges as high as about 12.5. In contrast, using the old method of heating benzene hexachloride with ferric chloride at temperatures of about 270–290° C., a mixture of trichlorobenzene of which the ratio of 1,2,4- isomer to 1,2,3- isomer is only about 3.1 is formed; and when using iron as the catalyst it is not uncommon to produce ratios of the 1,2,4-isomer to the 1,2,3-isomer of only about 2.9. In addition, with these old catalysts the reaction takes longer to complete, and requires higher temperatures than when my catalysts are used. When benzene hexachloride is dehydrochlorinated thermally, with no catalyst present, the ratio of 1,2,4-trichlorobenzene to 1,2,3-trichlorobenzene produced is approximately 4.4. In this case the rate of dehydrochlorination is greatly retarded. In contrast to the product mixtures which I obtain, which can contain varying amounts of 2,3,4,5,6-pentachlorocyclohexene-1, no mention has been made of this compound in product mixtures obtained with the iron and ferric chloride catalysts, or with thermal dehydrochlorination.

One manner in which my invention may be practiced is illustrated in Example I.

Example I

To a reaction vessel equipped with a mechanical agitator, a temperature measuring device and a packed distillation column was charged 100 parts by weight of crude benzene hexachloride and one part by weight of ammonium chloride. To the top of the packed distilling column was connected a condenser, a variable take-off distilling head containing a temperature measuring device, a distillate cooler, and a tared hydrogen chloride absorber containing sodium hydroxide solution.

The reaction vessel was heated by controlled external means, and the agitator was started as soon as the charge was fluid enough to be stirred. The reaction was considered to have started when hydrogen chloride fumes were observed. After a substantial reflux in the distillation column was established, distillate was taken off at a rate sufficient to maintain the reactor temperature at 285–290° C. during the major part of the run. The total reaction time was 44 minutes, and during the last few minutes the reactor temperature was raised to about 300° C. to effect distillation of the last portions of liquid from the reactor. The temperature of the vapor in the take-off head gradually rose from about 75° C. to about 220° C. during the course of the run.

The yellow distillate comprised 38 parts of product, which, by infra-red analysis, was found to comprise 26 parts of 1,2,4-trichlorobenzene, 4 parts of 1,2,3-trichlorobenzene, and 5 parts of 2,3,4,5,6-pentachlorocyclohexene-1.

The following additional examples will serve to illustrate the scope of my invention and the advantages obtained in its use. However the invention is not limited by these specific illustrative examples. The first three examples below are illustrative of results obtained using old methods of dehydrochlorinating benzene hexachloride. In Example II, the dehydrochlorination is accomplished solely by the application of heat. All parts and percentages used are on a weight basis.

Example II

Using the method described in Example I, 100 parts of crude benzene hexachloride were dehydrochlorinated thermally with no catalyst present. The reactor temperature was maintained at 284–288° C., and the vapor temperature varied from 203° C. to about 215° C. The rate of dehydrochlorination was followed by periodic weighing of the amount of hydrogen chloride absorbed by the sodium hydroxide in the hydrogen chloride absorber. The 50 per cent reaction time; that is, the time required for evolution of 50 per cent of the theoretical amount of hydrogen chloride for complete conversion of the benzene hexachloride to trichlorobenzene, was used as the criterion for velocity of the dehydrochlorination reaction.

The 50 per cent reaction time in this example was 63 minutes.

The liquid product, as analyzed by its infrared spectrum, was found to comprise 1,2,4-trichlorobenzene and 1,2,3-trichlorobenzene in the ratio of 4.4 parts of 1,2,4-trichlorobenzene to 1 part of 1,2,3-trichlorobenzene.

Example III

A mixture of 100 parts of crude benzene hexachloride and three parts of anhydrous ferric chloride was heated to a reactor temperature of 275–287° C. The 50 per cent reaction time was 31 minutes. Analysis of the reaction mixture after distillation showed it to comprise 1,2,4-trichlorobenzene and 1,2,3-trichlorobenzene in the ratio of 3.1 to 1. No. 2,3,4,5,6-pentachlorocyclohexene-1 was observed.

Example IV

A mixture of 100 parts of crude benzene hexachloride and 3 parts of powdered iron was heated to a reactor temperature of 285–300° C. he 50 per cent reaction time was 45 minutes. The ratio of 1,2,4-trichlorobenzene to 1,2,3-trichlorobenzene in the product mixture was 2.9 to 1.

The following group of examples, in which small amounts of some of my catalysts are used to aid dehydrochlorination, in contrast, points out the advantages and benefits of my invention.

Example V

A mixture of 100 parts of crude benzene hexachloride and 1 part of ammonium chloride was heated to a reactor temperature of 285–290° C. The 50 per cent reaction time was 24 minutes. The ratio of 1,2,4-trichlorobenzene to 1,2,3-trichlorobenzene in the product mixture was substantially 7 to 1. In addition, substantial amounts of 2,3,4,5,6-pentachlorocyclohexene-1 were observed in the distillate.

When the ammonium chloride is replaced with other ammonium-like compounds, such as ammonia, ammonium sulfate, ammonium acetate, ammonium carbonate, ammonium nitrate or ammonium propylate, substantially identical results are obtained.

Example VI

A mixture of 100 parts of benzene hexachloride and 1 part of urea was heated to a reactor temperature of 282–300° C. The 50 per cent reaction time was 30 minutes. Analysis of the product mixture showed a ratio of 1,2,4-trichlorobenzene to 1,2,3-trichlorobenzene of 5.4 to 1, as well as substantial quantities of 2,3,4,5,6-pentachlorocyclohexene-1.

Example VII

A mixture of 100 parts of crude benzene hexachloride and 1 part of triethylammonium chloride was heated to 220–245° C. The 50 per cent reaction time was 7 minutes. The ratio of 1,2,4-trichlorobenzene to 1,2,3-trichlorobenzene produced was 12.5 to 1.

When the triethylammonium chloride was replaced with triethanolamine, triamylamine, quinoline, pyridine, triethylamine and dimethylaniline, the ratios of 1,2,4-trichlorobenzene to 1,2,3-trichlorobenzene produced were 11.9, 11.8, 10.8, 10.7, 11.9 and 11.0, respectively.

When the triethylammonium chloride is replaced by triethanolamine hydrochloride, triethanolamine sulfate, triamylamine hydrochloride, triamylamine sulfate, trimethylamine, trimethylammonium chloride, trimethylammonium sulfate, quinoline hydrochloride, quinoline sulfate, isoquinoline, isoquinoline hydrochloride, isoquinoline sulfate, dimethylaniline hydrochloride, dimethylaniline sulfate, triethylammonium sulfate, tri-n-butyl amine, tri-n-butylammonium chloride, tri-n-butylammonium sulfate, pyridine hydrochloride, pyridine sulfate, triphenylamine, dimethylbenzylamine, dimethylbenzylamine hydrochloride, or dimethylbenzylamine sulfate, equally advantageous results are obtained.

*Example VIII*

A mixture of 100 parts of crude benzene hexachloride and 1 part of diethylamine was heated to 244–256° C. The 50 per cent reaction time was 10 minutes. The ratio of 1,2,4-trichlorobenzene to 1,2,3-trichlorobenzene produced was 8.9 to 1.

When the diethylamine is replaced by diethylammonium chloride, diethylammonium sulfate, diethanolamine, diethanolamine hydrochloride, diethanolamine sulfate, di-n-amylamine, di-n-amylammonium chloride, di-n-amylammonium sulfate, di-n-butylamine, di-n-butylammonium chloride, di-n-butylammonium sulfate, diphenylamine, methylaniline, methylaniline hydrochloride or methylaniline sulfate in the above procedure equally good results are obtained.

*Example IX*

A mixture of 100 parts of crude benzene hexachloride and 1 part of ethylamine was heated to a temperature of 265–270° C. The 50 per cent reaction time was 15 minutes. The ratio of 1,2,4-trichlorobenzene to 1,2,3-trichlorobenzene produced was 7.9 to 1.

When the ethylamine was replaced by sulfanilic acid in the above procedure, the ratio of 1,2,4-trichlorobenzene to 1,2,3-trichlorobenzene produced was 6.9.

When ethylamine is replaced by ethylamine hydrochloride, ethylamine sulfate, methylamine, methylamine hydrochloride, methylamine sulfate, ethanolamine, ethanolamine hydrochloride, ethanolamine sulfate, n-propylamine, n-propylamine hydrochloride, n-propylamine sulfate, n-butylamine, n-butylamine hydrochloride, n-butylamine sulfate, aniline, aniline hydrochloride, aniline sulfate, p-nitroaniline, p-nitroaniline hydrochloride, p-nitroaniline sulfate, p-chloroaniline or p-toluidine in the above procedure, substantially identical results are obtained.

*Example X*

A mixture of 100 parts of crude benzene hexachloride and 1 part of benzidine dihydrochloride was heated to a temperature of 257 to 275° C. The 50 per cent reaction time was 10 minutes. The reaction product mixture contained 1,2,4-trichlorobenzene and 1,2,3-trichlorobenzene in the ratio of 11.7 parts of 1,2,4-trichlorobenzene to 1 part of 1,2,3-trichlorobenzene.

When benzidine dihydrochloride is replaced in the above procedure by benzidine, benzidine disulfate, ethylene diamine, ethylene diamine dihydrochloride, p-phenylenediamine dihydrochloride, p-phenylenediamine, p-phenylenediamine disulfate, 1,8-diaminonaphthalene, or 1,8-diaminonaphthalene dihydrochloride, equally good results are obtained.

*Example XI*

A mixture of 100 parts of crude benzene hexachloride and 1 part of benzyltrimethylammonium chloride was heated to a temperature of 232–246° C. The 50 per cent reaction time was 7 minutes. The ratio of 1,2,4-trichlorobenzene to 1,2,3-trichlorobenzene in the product mixture was 10.9 to 1.

When the benzyltrimethylammonium chloride is replaced in the above procedure by tetramethylammonium chloride, tetramethylammonium hydroxide, tetraethylammonium chloride, tetraethylammonium sulfate, tetraethylammonium hydroxide, phenyltrimethylammonium chloride or phenyltrimethylammonium hydroxide, equally good results are obtained.

When each of the above procedures is applied to alpha-benzene hexachloride or the crude mixture from which gamma benzene hexachloride has been removed, equally beneficial results are obtained.

In each of the above procedures, the following additional catalysts may be employed with equally good results: phenylhydrazine, phenylhydrazine hydrochloride, p-nitrophenylhydrazine, 2,4-dinitrophenylhydrazine, hydroxylamine, hydroxylamine hydrochloride, cyanamide, ammonium carbamate, ammonium sulfamate, ethyleneimine, or p-benzoquinonimine.

My invention may be carried out as either a batch process or a continuous process. One variation of batch operation has been described in Example I, above.

In the continuous embodiment, which is the preferred embodiment of my invention, molten or solid benzene hexachloride is continuously charged to a pot-type vessel or tube-type vessel containing a charge of catalyst or, alternatively, benzene hexachloride and catalyst can be charged to the vessel concurrently. Heat is applied to the vessel, and reaction products are continuously removed and recovered from the reaction mixture by distillation and subsequent condensation. Hydrogen chloride is continuously removed and collected in a hydrogen chloride scrubber. The mixture of 1,2,4-trichlorobenzene, 1,2,3-trichlorobenzene and 2,3,4,5,6-pentachlorocyclohexene-1 which comprises the distillate is resolved by fractional distillation or other means.

The temperature employed in my process is not critical, except that temperatures of at least about 180° C. are preferably employed. Generally, in order to avoid losses of benzene hexachloride by boiling, the temperature should be not higher than about 300° C. In the preferred process applications of my invention, I remove the trichlorobenzenes produced by continuous distillation from the reaction mixture. Since the boiling point of 1,2,4-trichlorobenzene at normal pressures is about 213° C. and that of 1,2,3-trichlorobenzene is about 219° C., I prefer to operate at a temperature of at least about 220° C. My preferred range of temperature, therefore, lies between about 220° C. and 300° C.

The amount of catalyst employed can be varied between a very low percentage, such as about 0.01 per cent of the weight of benzene hexachloride to about 10 per cent of the weight of benzene hexachloride. However, percentages greater than about 2 per cent of the weight of benzene hexachloride provide only minor additional benefits, so I prefer to use proportions of catalyst not greater than about 2 per cent of the weight of benzene hexachloride being reacted.

Among the catalysts herein described, I prefer to use the tertiary amines and salts thereof, since with these catalysts I obtain the fastest dehydrochlorination rate, and the highest ratio of 1,2,4-trichlorobenzene to 1,2,3-trichlorobenzene and can employ lower reaction temperatures than with the other catalysts of my invention.

I claim:

1. A process for the dehydrochlorination of benzene hexachloride to produce trichlorobenzene having an enhanced 1,2,4-trichlorobenzene concentration comprising contacting benzene hexachloride at a temperature of at least 180° C. with a catalytic amount of an aminoid compound basic under reaction conditions.

2. The process of claim 1 wherein the weight ratio of said benzene hexachloride to said aminoid compound is at least about 100:2.

3. The process of claim 1 in which the reaction is carried out of a temperature between about 220–300° C.

4. The process of claim 1 in which said aminoid compound is an amine.

5. The process of claim 4 wherein said amine is aniline.

6. The process of claim 4 wherein said amine is diethyl amine.

7. The process of claim 4 wherein said amine is dimethyl aniline.

8. The process of claim 4 wherein said amine is quinoline.

9. The process of claim 1 wherein said aminoid compound is an ammonium compound.

10. The process of claim 9 in which said ammonium compound is benzyl trimethyl ammonium chloride.

References Cited in the file of this patent

UNITED STATES PATENTS 2,569,441　Alquist et al. _____ Oct. 2, 1951

FOREIGN PATENTS 955,816　France _____ July 4, 1949

OTHER REFERENCES

Groggins: "Unit Processes in Organic Synthesis," third edition, pp. 215–217 (1947).